Oct. 14, 1952     E. A. RUSSELL ET AL     2,613,919
ELECTRICAL SYSTEM FOR CONTROLLING THE
TEMPERATURE OF INDIVIDUAL AIR STREAMS
Filed Feb. 12, 1949     4 Sheets-Sheet 1

Inventors.
Edward A. Russell
Timothy J. Lehane
Robert E. Pidgeon
By Harvey M. Gillespie Atty.

Oct. 14, 1952 — E. A. RUSSELL ET AL — 2,613,919
ELECTRICAL SYSTEM FOR CONTROLLING THE
TEMPERATURE OF INDIVIDUAL AIR STREAMS
Filed Feb. 12, 1949 — 4 Sheets-Sheet 2

Inventors:
Edward A. Russell
Timothy J. Lehane
Robert E. Pidgeon
By Harvey M. Gillespie Atty.

INVENTORS.
Edward A. Russell
Timothy J. Lehane
BY Robert F. Pidgeon
Harvey M. Gillespie Atty.

Fig. 10

Patented Oct. 14, 1952

2,613,919

UNITED STATES PATENT OFFICE 2,613,919

ELECTRICAL SYSTEM FOR CONTROLLING THE TEMPERATURE OF INDIVIDUAL AIR STREAMS

Edward A. Russell and Timothy J. Lehane, Chicago, and Robert E. Pidgeon, Round Lake, Ill., assignors to Vapor Heating Corporation, Chicago, Ill., a corporation of Delaware Application February 12, 1949, Serial No. 75,992

15 Claims. (Cl. 257—3)

This invention relates to an improved electrical system for controlling the temperature of a plurality of enclosures by controlling the temperature of individual streams of air diverted from a source of pretreated air (heated or cooled) and delivered into the several enclosures.

A principal object of the invention is to provide a control system whereby the occupants, of one or more separate compartments of a series, may maintain temperatures of their own liking in their individual compartments, by suitably altering the air temperature immediately prior to its delivery into such compartments, without materially altering or affecting the temperature of other compartments served by the same heating and/or cooling apparatus.

According to the principles of the invention, air is preheated or cooled to provide a supply of air at a predetermined temperature and this air is directed through separate passages into the individual enclosures or into different sections of the same enclosure. When the temperature of the said supplied air is unsuitable for maintaining one or more of the enclosures at the temperature desired, the temperatures of the individual streams of air delivered to such enclosures are altered, as hereinafter described, to provide air at the desired temperatures.

The temperatures of the individual streams of air may be altered by blending air streams of different temperatures or by adding heat to the individual air streams immediately prior to the delivery of the air into the enclosure. In the first case, a proportioning valve is utilized in connection with each air stream to vary the amount of air of different temperatures used in the blended stream. If heat is added directly to the separate streams of air, heater elements are positioned in the branch ducts leading from the main source of pretreated air into the individual enclosures.

It is a specific object of the invention to provide an automatic control system which can be used in connection with either of the combined heating and cooling systems above described, whereby air may be delivered at the same or at different selected temperatures at various locations.

The invention is illustrated in certain preferred embodiments in the accompanying drawings wherein.

The electrical control system of the present invention is illustrated herein in connection with a combined heating and cooling system in which the temperature of an enclosed space, or of a series of enclosed spaces, is altered by controlling the temperature of the air at the location where it is delivered into the enclosed space.

According to the heating and cooling system shown in Figs. 1 to 4, inclusive, air, after being heated or cooled to a desired temperature, by means of a heater 10 or a cooler 11, is forced into a main air duct 12 composed of a primary section 13 and a return section 14. Both sections of the air duct extend substantially the full length of the main enclosure whose temperature is being controlled. The primary section 13 of the air duct connects at its outer end 15 with the return section 14 so that air from the blower 16 may flow through the primary section 13 of the duct for the full length of the enclosure 17, for example a railway car, and then flow through the return section 14 of the duct for the full length of the car.

Because of the combined lengths of the air duct sections 13 and 14, there is a progressive change in the temperature of the air in proportion to the length of its travel within the air duct. Consequently, the temperature of the air changes in proportion to the length of its travel from the heater 10 or cooler 11. Therefore, in order to deliver air at the desired temperature throughout the entire length of the car, the air is taken from both duct sections 13 and 14, at suitable locations, and blended into air streams of the desired temperature. These blended streams of air are then delivered into the enclosed space or series of spaces, as the case may be.

The railway car 17, herein shown, by way of illustration, is subdivided into a plurality of separate enclosures, known generally as "roomettes." The separate enclosures are relatively small and are arranged on opposite sides of a central aisle designated A. Inasmuch as the roomettes at opposite sides of the aisle are of like size and are served by identical air ducts and control means, the present invention will be described with reference to the enclosures located along one side only of the aisle. The various ducts, radiators and control elements which serve the enclosures on the other side of the aisle A will be designated with the same reference characters provided with an exponent 1. The several roomettes along one side of the aisle A are designated B, C, D and E. There are also certain open sections designated F and G which communicate with the aisle A and are normally maintained at the same temperature as the aisle.

Figures 3, 4:
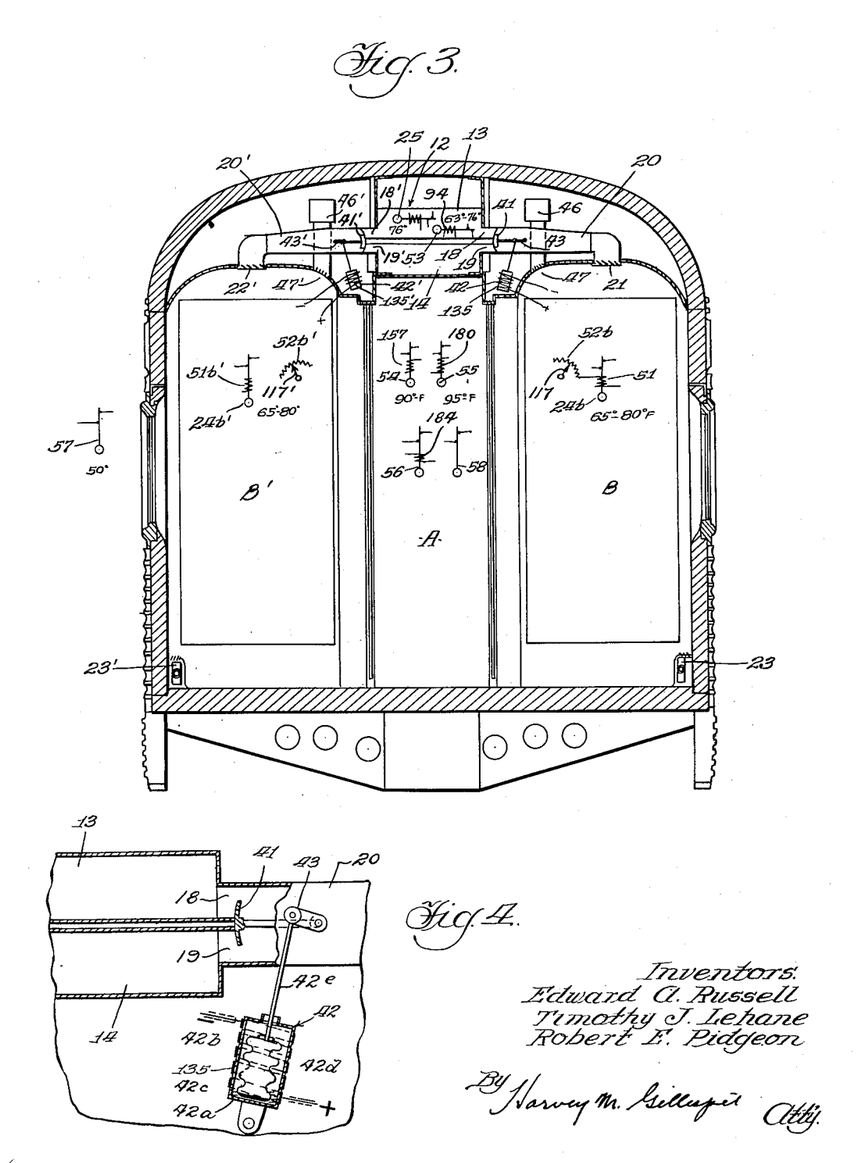
Fig. 3 is a cross-sectional view taken through the car to show the air ducts, thermostats, and the proportioning valves for controlling the delivery of blended air into the car.
Fig. 4 is a sectional view of one of said proportioning valves and a means for operating the same.

Proportionate amounts of air, at different temperatures, are discharged from both duct sections 13—14 through discharge ports 18—19 into each of the several enclosed spaces (see Fig. 3). This air is received and blended in branch ducts 20 leading from each pair of discharge ports to outlet grills 21 which open through the ceiling of the roomettes.

In addition to the main air heater 10, the improved system is provided with an auxiliary heater 22 positioned in the air duct section 14 and a series of floor radiators 23, one for each enclosed space B, C, D, E, F and G. The operation of the floor radiators are controlled by temperature responsive means including thermostats 24$^b$, 24$^c$, 24$^d$, 24$^e$, 24$^f$ and 24$^g$, etc., responsive to the temperature of the several enclosed spaces in which the floor radiators are located. The auxiliary air heater 22 is controlled by a thermostat 25 located in the duct 13 and set to function at 76° F. The said heater 22 is also dependent upon the opening of at least one room thermostat, 24$^b$, $^c$, $^d$, etc. Consequently, the said auxiliary air heater 22 is operative only when the duct temperature is below the functional setting of the duct thermostat 25 (76° F.) and when the temperature of at least one room B, C, D or E is below the functional setting of its thermostat.

Figure 6:
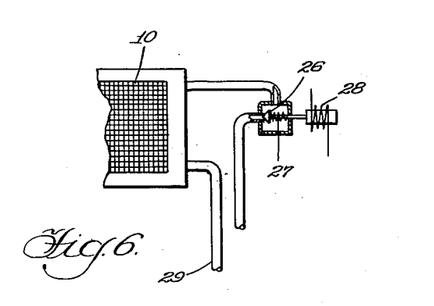
Fig. 6 is a fragmentary view of the main air heater and showing a solenoid inlet valve for controlling the delivery of heating medium thereto.
Figure 7:
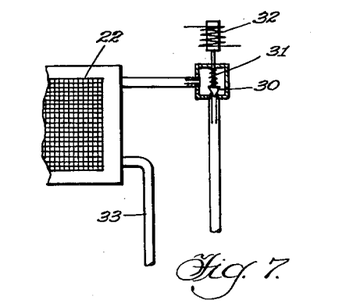
Fig. 7 is a similar view of an air heater and a solenoid valve for controlling the delivery of heating medium thereto.
Figures 8, 9:
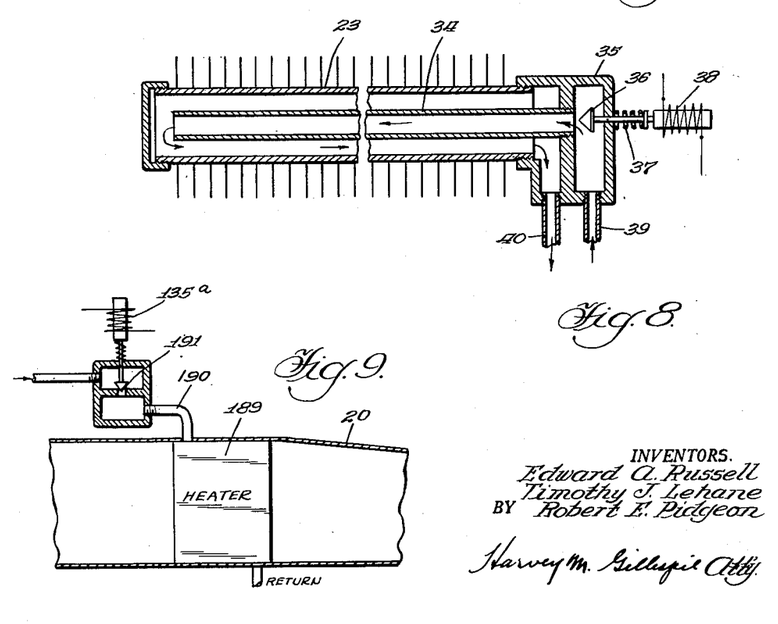
Fig. 8 illustrates one of the floor radiators, including its solenoid inlet valve.
Fig. 9 is a view showing, on a larger scale, one of the individual heaters shown in Fig. 5 and a solenoid inlet valve associated therewith.

The several heating elements 10, 22 and 23 are shown in Figs. 6, 7 and 8, respectively, in connection with conventional valve structures. The delivery of heating medium to main heater 10 is controlled by inlet valve 26 which is normally closed by a spring 27 and is opened to admit heating medium, for example steam, to the heater by energization of solenoid 28. The condensation is discharged from heater 10 through pipe 29.

The heating medium to the auxiliary air heater 22 is controlled by means of a valve 30 which is normally closed by a spring 31 and is opened by the energization of a solenoid 32. A drain pipe for discharging the spent heating medium is shown at 33.

Each floor radiator includes outer and inner concentric pipes. The inner pipe 34 leads from a valve casing 35 and delivers heating medium into the outer pipe adjacent its outer end. The delivery of heating medium to the inner pipe is controlled by a valve 36 which is normally held open by a spring 37 and closed by the energization of solenoid 38. The heating medium enters valve casing 35 through pipe 39 and is discharged from the radiator 23 through outlet pipe 40.

The air discharged from each port 18—19 is controlled by a proportioning valve 41. This valve may be actuated by any suitable means 42, adapted to be directly or indirectly controlled, electrically, in relation to the temperature of the enclosed space receiving the blended air stream. In the disclosure in Figs. 1, 2 and 3, the means 42, for purpose of convenience, is illustrated in the form of a heat motor. Inasmuch as the heat motor, illustrated diagrammatically in Fig. 4, is of known construction and is fully disclosed in Patent No. 2,391,342, a brief description of its structure and function will be sufficient for the present disclosure. The said heat motor may be described briefly as comprising an outer casing 42$^a$, a bellows element 42$^b$ enclosed in the casing, and a heating coil 135 applied in an approved manner around the outer surface of the casing. The said casing is open only at one end. The bellows has a closed end portion 42$^c$ which extends into the casing 42$^a$ and has an open end secured in the open end of said casing. The space between the bellows and the said casing constitutes a closed chamber 42$^d$ for containing a temperature sensitive fluid. Each heat motor 42 and its associated valve 41 is operatively connected by means of a push rod 42$^e$ which connects the closed lower end of the bellows 42$^b$ with a pivoted lever 43. The valve and its operating means are so adjusted that the valve 41, in one position of its operation, assumes a central position so as to deliver equal amounts of air from the duct sections 13 and 14 into the branch duct 20. If the temperature within the controlled space associated with the heat motor 42 rises above a predetermined temperature, an electrical energizing current is directed through the heating coil 135 of the heat motor so as to heat and thereby expand the temperature sensitive fluid so as to partially compress the bellows and thereby move the valve 41 in a direction to increase the amount of cool air delivered from air duct section 14 and to proportionately decrease the amount of higher temperature air delivered from the duct section 13. When the temperature of the roomette falls below the desired control point the heat motor 42 is deenergized and therefore cools. The cooling of said motor moves the valve 41 in a direction to increase the amount of higher temperature air delivered into the blended air stream and to correspondingly decrease the amount of cooler air entering into said blended air stream.

While the invention, as herein disclosed, includes the use of said heat motor 42, various other forms of valve actuators may be used to adjust the position of the valve 41.

Figure 2:
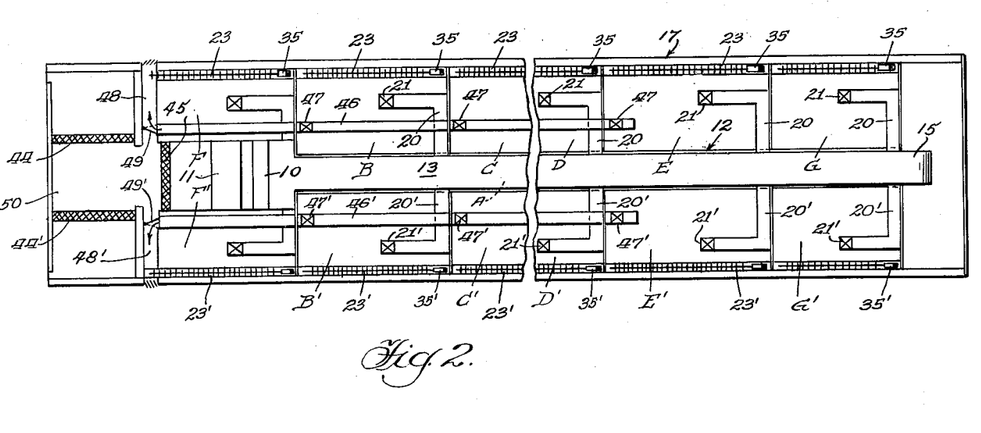
Fig. 2 is a diagrammatic plan view taken substantially on line 2—2 of Fig. 1, showing the arrangement of individual compartments and the overhead ducts for delivering heated or cooled air into said compartments.

During normal heating and cooling operations the air to be heated or cooled is drawn from the vestibule space 43 of the car, the air passing through suitable filters 44—45 before entering the blower 16 and primary air duct 13. The air from each of the enclosures of the car is normally vented to the outside atmosphere through vent duct 46 which lead from outlet grills 47 to outlet duct 48 (Fig. 2). A valve 49 is positioned in outlet duct 48 so as to normally direct the vented air to the outside of the car. However, when it is desired to recirculate a portion of the vented air, the valve 49 may be adjusted toward the dotted line position shown in Fig. 2 so as to direct all or a portion of the air into the air receiving chamber 50.

Referring now to the electric control system: The room thermostats 24$^b$, $^c$, $^d$, etc., for controlling the operation of the floor radiators 23 are provided with auxiliary heaters 51$^b$, $^c$, $^d$, etc. Each thermostat 24$^b$, $^c$, $^d$, etc., is connected in series with a variable resistor 52$^b$, $^c$, $^d$, etc., whereby the functional setting of the individual thermostats may be adjusted. The range of this adjustment, for the present disclosure, is 65° F. to 80° F. A thermostat 53, having an operating range from 63° F. to 76° F., is located in the primary air duct 13 for controlling the operation of the main air heater 10.

The functioning of the cooler 11, during one phase of its operation, is under the control of a pair of thermostats 54—55. These thermostats, for the purpose of convenience, are located in the open portion F of the car body and are set to close at different temperatures; the thermostat 54 being set to close its contacts at 90° F. and the thermostat 55 being set to close at 95° F. The said thermostats 54—55 cooperate with each other to control the cooling means during different cooling loads. For example, the thermostat 54 controls the operation of cooler 11 during normal cooling loads. When the cooling requirements exceed the normal demands, the temperature will rise until the thermostat 55 functions at 95° F. The functioning of thermostat 55 energizes to move the valve 49 to a position to recirculate through the cooler 11, the previously cooled air vented from the several rooms B, C, D and E.

In addition to the thermostats above referred to, the system includes three additional thermostats designated 56, 57 and 58. Said thermostat 56 is located in the body of the car and is set to function at 100° F. Its contacts are connected in parallel with the contacts of the duct thermostat 53. Consequently, during the cooling cycle when the duct temperature may be below the functional setting of said duct thermostat 53, but the interior temperature of the car is 100°, the said thermostat 56 will function to deenergize the overhead heater 10 and thereby prevent reheating of the previously cooled air. The thermostat 57 is located outside the enclosed space 17 so as to respond to the outside temperature. It is set to function at 50° F. and is so connected in the system that any time the outside temperature stands below 50° F., the cooling element 11 is made ineffective, but any time the outside temperature stands at or above said 50° F. the cooling element 11 is made effective for use in the event that cooling is required.

The thermostat 58 is located in the enclosure so as to respond to the temperature of the enclosure as a whole. It is set to function at 60° F. and is so connected in the electrical system that it may be used to control the car when the car is temporarily out of service, for example during lay-over periods at a railway terminal.

Heating phase of system

Figure 10:
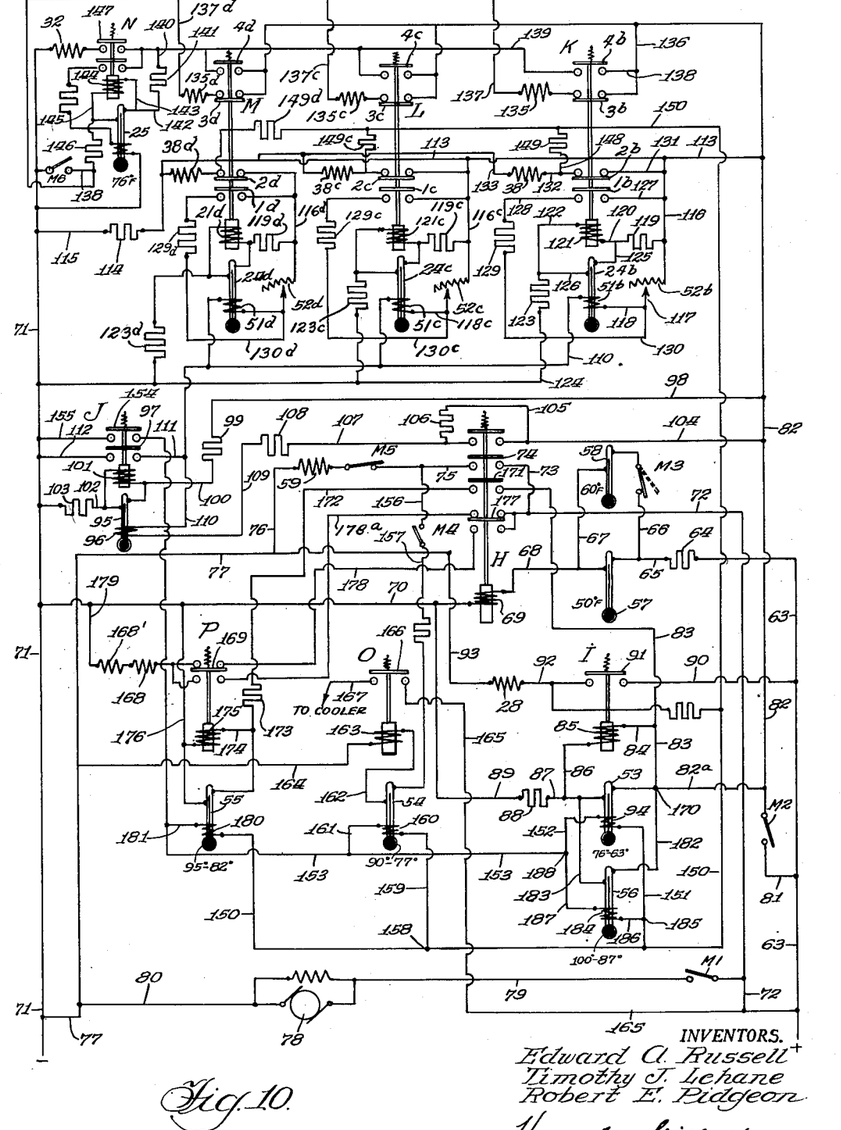
Fig. 10 is a wiring diagram of the improved electrical control system of the present invention.

Referring now to the wiring diagram shown in Fig. 10: The various control elements are shown deenergized, with the several switches M$^1$, M$^2$, M$^4$, M$^6$ in their open position and the switches M$^3$ and M$^5$ are in their closed positions. It will also be assumed, for the description of the initial heating phase of the system, that the outside temperature is below 50° F. and the car is temporarily out of service with its inside temperature below 60° F.

Lay-over heating

Figure 1:
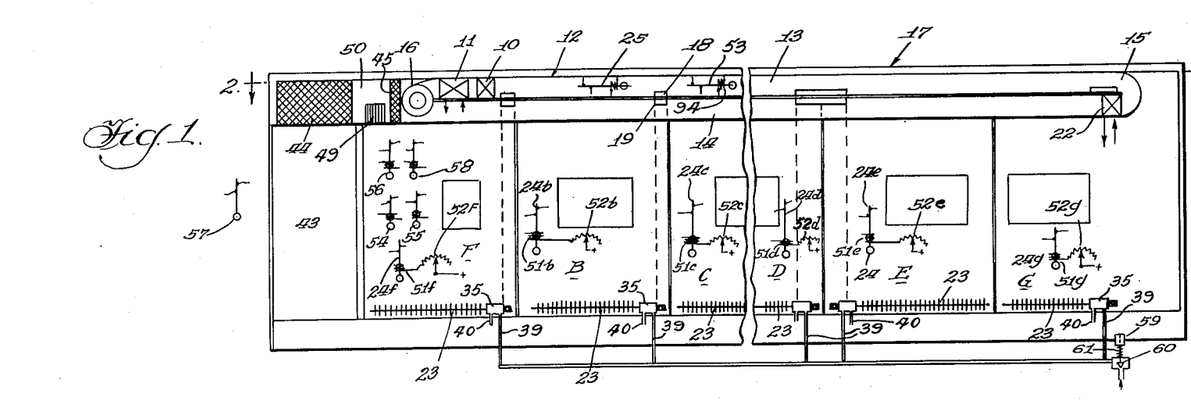
Fig. 1 is a diagrammatic view of a railway car provided with a combined heating and cooling system of a general type in which air streams of different temperatures are blended and introduced into one or more of a series of enclosures.

During a lay-over period of the car, as herein assumed, the switches M$^3$ and M$^5$ are closed so as to put the heat supply under the control of thermostat 58. So long as the temperature outside the enclosure 17 remains below 50° F. (the functional setting of thermostat 57) and the temperature inside the enclosure as a whole remains below the functional setting of thermostat 58 (60° F.), the solenoid 59 of a main supply valve 60 (Fig. 1) remains deenergized and the valve is held open by a spring 61 to supply heating medium to the floor radiators 23. The heating medium will flow through each of the floor radiators, since the admission valves 36 thereof are held open (see Fig. 8) by spring pressure when their actuating solenoids 38 are deenergized. As soon as the temperature of the enclosure 17 rises to 60° F., the thermostat 58 functions to close an energizing circuit through a solenoid 69 of relay H to energize the heat supply valve solenoid 59 and thereby closes the heat supply valve 60 (Fig. 1). The said energizing circuit for relay H leads from positive line 63 through resistor 64, wires 65—66, closed switch M$^3$, thermostat 58, wires 67—68, relay coil 69 and wire 70 to the negative line 71. The circuit closed through said relay H for energizing the main valve solenoid 59 leads from positive line 63 through wires 72—73, closed contact 74 of relay H, wire 75, switch M$^5$, valve solenoid 59 and wires 76—77 to the negative line 71. The same results are obtained by the closing of a circuit through the outside thermostat 57. Consequently, it will be apparent that whenever the outside temperature rises to or above 50° F., the relay H is energized and the supply of heating medium to all floor radiators 23 is shut off.

Normal heating

During the normal heating cycle, the switches M$^1$, M$^2$, M$^4$, M$^5$ and M$^6$ are closed, but switch M$^3$ is open. The closing of the switch M$^1$ directs energizing current through a motor 78 for operating the blower 16. This circuit leads from positive line 63 through wire 72, switch M$^1$, wire 79, motor 78, wires 80 and 77 to the negative line 71. This motor circuit remains closed during both the normal heating and cooling cycles of the system.

The closing of switch M$^2$ establishes an electrical circuit to actuate relay I and thereby close an energizing circuit through solenoid 28 for opening heat valve 26 to heater 10 (Fig. 6). The circuit for energizing the relay I leads from positive line 63 through wire 81, switch M$^2$, wires 82, 82$^a$, 83, 84, through actuating coil 85 of relay I, wires 86, 87, resistor 88 and wires 89 and 70 to the negative line 71. The energizing circuit for valve solenoid 28 leads from positive line 63 through wire 90, closed contact 91 of relay I, wire 92, through solenoid 28 and thence through wires 93 and 77 to the negative line 71.

The relay I is under the direct control of duct thermostat 53 which is located in the hot air duct 13 and is set to function at a temperature of 76° F. When the temperature at said thermostat 53 reaches its functional setting, the mercury column of the thermostat closes a connection between wires 82$^a$ and 87 so as to short out the relay coil 85 and thereby deenergize the relay I. The said thermostat 53 is provided with an auxiliary heater 94 adapted to receive variable amounts of heat, from time to time, and thereby adjust the thermostat to a lower setting. A fixed amount of heating current (½°) is added to the heater 94 for each room thermostat 24$^b$, 24$^c$, etc., which becomes satisfied. Inasmuch as the car 17 has a total of 26 room thermostats, the thermostat 53 will function at a duct temperature of 63° F., when all of the room thermostats are satisfied. In this way the thermostat 53 and its relay I are made available to add heat to the previously cooled air during the cooling operation of the system and to vary the amount of heated air delivered during certain phases of the heating cycle. The means for directing the variable amounts of heating current to thermostat 53 will be described in connection with the circuits closed during the individual control of the separate rooms.

Wattage regulator

The closing of said switch M$^2$, in addition to making the above circuits available, closes an energizing circuit through a relay J used in connection with a thermostat 95 to provide a suitable wattage regulator. The circuits for all auxiliary heaters are connected through the wattage regulator to negative line 71, the thermostat 95 being provided with an auxiliary heater 96 which is connected through the lower contact 97 of relay J to produce a desired cycling action. The circuit for energizing the relay J leads from the positive line 63, through wire 81, closed switch M$^2$, wires 82, 98, resistor 99, wire 100, actuating coil 101 of relay J, wire 102 and resistor 103 to the negative line 71. The circuit for the auxiliary heater 96 of the wattage regulator thermostat 95 leads from said wire 82 through wires 104—105, resistor 106, wire 107, resistor 108 and wire 109 to said auxiliary heater 96, thence through wires 110, 111 closed contact 97 of relay J and wire 112 to the negative line 71.

Individual room control

The closing of switch M$^2$ also directs electrical current through a bus connector 113 leading from said wire 82 to supply electrical current to the solenoids 38. The room thermostats and their associated relays are connected in circuits leading from the said bus connector 113. In order to minimize the description of the wire diagram, only three of said room thermostats are shown in the diagram, and it will be sufficient to describe the control circuits for only one such thermostat, for example thermostat 24$^b$, since the control circuits for the other room thermostats 24$^c$—24$^d$ and their associated relays L and M are identical and are connected in parallel with each other. Consequently, it will be sufficient to designate the corresponding control circuits for the thermostats 24$^c$—24$^d$ with like reference characters having exponents "c" and "d," respectively.

The energizing circuit for the auxiliary heater 51$^b$ of said thermostat 24$^b$ leads from the bus connector 113, through wire 116, variable resistor 52$^b$, movable contact 117, wire 118, through the auxiliary heater 51$^b$, and thence through wires 110, 111, closed contact 97 of relay J and wire 112 to negative line 71. By means of the said variable resistor 52$^b$, as previously described, the occupant of the room may adjust the functional setting of thermostat 24$^b$ substantially 15°. That is to say, the adjustment as shown in Figs. 3 and 10 represent a temperature setting of approximately 72° F., and it is possible by movement of the contact arm 117 toward the right to supply the thermostat with additional heating current so that it will function at a room temperature of 65°. By turning the movable arm 117 toward the left the amount of electric current is reduced so that the temperature setting can be raised to function at a room temperature of 80° F.

An energizing circuit for the relay K leads from wire 113 through wire 116, resistor 119, and wire 120 to the actuating coil 121, and thence through wire 122, resistor 123 and wire 124 to the negative line 71. The said energizing circuit for the relay is controlled by the thermostat 24$^b$. In this connection the positive side of the relay coil 121 is connected by wire 125 to the upper contact of the thermostat and the negative side of said coil is connected through wires 126 and 122 to the lower contact of said thermostat. It will be seen, therefore, that when the mercury column of thermostat 24$^b$ stands below its upper contact the relay coil 121 is energized to move the relay K into position to close its contacts 1$^b$, 3$^b$ and 4$^b$ and to open its contact 2$^b$. However, when the mercury column of thermostat 24$^b$ rises into engagement with the upper contact of said thermostat, electric current passes through wires 125 and 126 and through the resistor 123, wire 124, to the negative line, thereby shorting out the relay coil 121. Under such condition, the relay is de-energized and assumes the position shown in Fig. 10 in which the contacts 1$^b$, 3$^b$ and 4$^b$ are open and contact 2$^b$ is closed. When the relay K is energized the closing of contact 1$^b$ directs additional heating current to the auxiliary heater 51$^b$. The path for this additional current leads from wire 116, through wire 127, closed contact 1$^b$ of relay K, wire 128, cycle resistor 129 and wires 130 and 118 to the auxiliary heater 51$^b$ and thence through wires 110, 111, closed contact 97 of relay J and wire 112 to negative line 71. The cycle resistor 129 has a value of 2°. Consequently, the thermostat 24$^b$ will cycle any time the temperature at the thermostat is within 2° of its functional setting. The said energization of the relay K opens its contact 2$^b$ and, therefore, deenergizes the solenoid 38 and permits the valve 36 of the floor radiator to open, said valve being opened by pressure of a spring 37 (Fig. 8), and closed by the energization of the said solenoid 38. This solenoid, as will be observed by inspection of Fig. 10, is interposed in a branch leading from bus connector 113, through wires 116, 131, closed contact 2$^b$ of relay K, wire 132, solenoid 38 and thence through wire 133, resistor 114 and wire 115 to the negative line 71. Simultaneously with the delivery of heating medium into the floor heaters, the closing of contact 3$^b$ of the relay K opens a heating circuit through the coil 135 of the heat motor 42 so that the cooling of the motor imparts a slight movement to the proportioning valve 41 in a direction to supply a larger proportion of hot air to the blended stream of air in branch duct 20 and to correspondingly reduce the amount of cooler air used in the blended stream.

The said heat motor energizing circuit leads from wire 82, through wire 136, closed contact 3$^b$ of relay K, heat motor coil 135, wires 137—138, and closed switch M⁶ to the negative line 71. As soon as the relay K is energized to open contact 3ᵇ, the heat motor cools somewhat and thereby moves the proportioning valve 41 in a direction to reduce the amount of cool air delivered from air duct section 13 into the branch duct 20.

The closing of relay contact 4ᵇ establishes an energizing circuit through relay N for closing an energizing circuit through the solenoid 32 of valve 30 to supply heating medium to the auxiliary air heater 22. This energizing circuit leads from wires 82—136, wire 138, closed contact 4ᵇ of relay K, wire 139—140, resistor 141, wires 142 and 143 to actuating coil 144 of relay N, thence through wire 145, resistor 146, wire 138, and closed switch M⁶ to the negative line 71. This circuit closes the relay N and thereby establishes a circuit leading from said wire 139 through the upper contact 147 of said relay N through the solenoid 32 for controlling said inlet valve 30 (Fig. 7) of the auxiliary air heater 22.

The operation of the relay N, as previously indicated, is controlled by thermostat 25, the thermostat being located in the hot duct 13 and set to function at an air temperature of 76° and is connected through each of the floor heat relays 24ᵇ, ᶜ, ᵈ, etc. Consequently, the relay N will function only when the temperture of the air in the hot duct 13 is below the temperature of 76° and one of the room thermostats 24ᵇ, ᶜ, ᵈ, etc., is calling for heat. Therefore, the relay N and auxiliary air heater 22 will be effective to add heat to the air in the return duct 14 only during the presence of an abnormal heating load or during the cooling cycle of the system.

Weighted average control

Whenever the temperature of an enclosed space B, C, D, E, etc., reaches the temperature setting of its thermostat 24ᵇ, ᶜ, ᵈ, ᵉ, the relay K, L, M, etc., associated with such thermostat is deenergized, as previously described, to close its contact 2ᵇ, ᶜ, ᵈ, ᵉ, and thereby shut off the supply of heat to its floor radiator. Simultaneously with the shutting off of the floor radiator, a heating circuit is established through the auxiliary heater 94 of the thermostat 53 so as to reduce the temperature setting of this thermostat. This heating circuit leads from wire 82, through bus connector 113, wires 116, 131, closed contact 2ᵇ of relay K, wire 148, weighted average resistor 149, wires 150 and 151, through said auxiliary heater 94, and thence through wires 152, 153, upper contact 154 of relay J and wire 155 to the negative line 71. The value of each weighted average resistor 149, 149ᶜ, ᵈ, etc., is one-half degree. Consequently the functioning of thermostat 24ᵇ, ᶜ, ᵈ, etc., in one enclosed space and the consequent deenergization of its relay K, L, M, etc., closes the energizing circuit through the weighted resistor 149 and thereby directs sufficient current to the auxiliary heater 94 to raise the temperature of thermostat 53 one-half degree. Ordinarily, there are twenty-six individual enclosures in a passenger car such as shown in Figs. 1, 2 and 3 of the drawings. Consequently, when all of the room thermostats are satisfied the auxiliary heater 94 of thermostat 53 receives heating current sufficient to raise its temperature 13°. In other words, the thermostat 53 is set down from its normal setting of 76° F. to 63° F.

Assuming that the temperatures of all enclosed spaces B, C, D, E, etc., reaches the functional setting of their respective thermostats 24ᵇ, ᶜ, ᵈ, ᵉ, etc., the inlet valves of the floor radiators 23 and overhead air heaters 10 and 22 are closed so as to prevent the delivery of heating medium thereto. If the outside temperature, under the above conditions, is below 50°, the blower 16 will supply ventilation to the various rooms until further heat is required. However, if the temperature in any one individual room is lowered sufficiently to cause its thermostat to break contact, heating medium will be delivered to the floor radiator 23 of that space and the auxiliary air heater 22 will also receive heating medium if the temperature in duct 13 is below 76°, the functional setting of thermostat 25.

Assuming now that the outside temperature rises to 50° F.: Thermostat 57 functions to energize relay H. The closing of contact 74 of relay H energizes solenoid 59 to close the main valve 60 (Fig. 1) and thereby shuts off the supply of heating medium to all floor radiators 23. It will be observed, however, that a supply of heating medium is still available for the overhead air heaters 10 and 22 so that these heaters may function, during the cooling cycle, to add heat to the previously cooled air, the heater 22 operating any time that the duct temperature is below 76°, the functional setting of thermostat 25, provided that any one of the individual space thermostats 24ᵇ, ᶜ, ᵈ, etc., is also calling for heat.

The energization of said relay H, in addition to interrupting the supply of heating medium to all floor radiators, directs electric current through wire 156, switch M⁴ and wire 157 to the upper contact of thermostat 54 and thereby makes electricity available for the energization of cooler relay O, when the temperature at thermostat 54 is sufficient to close its contacts. This thermostat is positioned in the body of the car so as to respond to the temperature of the aisle A and the open spaces F—G of the car. It is set to function at a temperature of 90° F., but this functional setting is varied by electric current supplied, through the several weighted average resistors 149, 149ᶜ, 149ᵈ, etc., to electrical auxiliary heater 160. The said auxiliary heater 160 for the cooling control thermostat 54 is connected in parallel with the electrical auxiliary heater 94 of said air heater control thermostat 53. Consequently the functional settings of both thermostats are lowered ½° for each weighted average resistor 149, 149ᶜ, 149ᵈ, etc., which is made effective by the functioning of its associated room thermostat 24ᵇ, 24ᶜ, 24ᵈ, etc. It will be seen, therefore, that when all of the weighted average resistors are effective, the cooling control thermostat will function at a temperature in space A of 77° F. and that the heating control thermostat 53 will function at a duct temperature of 63° F. Consequently, the heating control thermostat 53 will remain closed and the main heater 10 will be inoperative during the cooling cycle of the control system. However, if the temperature of the cooled air in the duct 13 falls below the temperature setting of thermostat 25, to-wit 76° F., the air heater 22 is made available to add heat to the cooled air, if and when any one of the rooms B, C, D, etc., fall below the temperature settings of their control thermostats 24ᵇ, ᶜ, ᵈ, etc.

The heating current for said heater 160 leads from a junction 158 in wire 150, through wires 159 to heater 160 and thence by wires 161 and 153 to closed contact 154 of wattage regulator relay J and wire 155 to the negative line 71.

When the temperature of the open spaces of the enclosure 17 plus the heat added by heater 160 is sufficient to cause the thermostat 54 to function, the relay O for cooler 11 is closed by an energizing circuit leading from the lower contact of the thermostat 54 through wire 162, coil 163 of relay O, and thence by wires 164 and 77 to the negative line 71.

The closing of relay O closes a power circuit leading from positive line through the various electrically operating mechanisms (not shown) for making the cooler 11 effective. This power circuit leads from positive line 63 through wire 165, to closed contact 166 of relay O and thence by wire 167 to the operating mechanisms associated with cooler 11. Therefore, cooled air will be supplied to the enclosure as a whole, including each of the individual spaces A, B, C, D, etc., until the cooling control thermostat 54 breaks contact, at which time the operation of cooler 11 is discontinued. However, as herein before indicated, if any one or more of the room thermostats 24$^b$, 24$^c$, 24$^d$, etc., should break contact while the temperature in air duct 13 is below 76° F. the heater 22 will be energized to add heat to the cooled air. It will be also observed, in this connection, that when a room thermostat 24$^b$, 24$^c$, etc., breaks contact while the temperature in duct 13 is at or above 76°, for example when such room thermostat has its higher adjusted setting, such condition will result merely in removing a portion of the auxiliary heat from thermostats 53, 54, 55 and 56.

Recirculation of air

If the cooling load is such that the cooler 11, when operating at full capacity and using only air drawn in from outside the enclosure 17, is unable to maintain the temperature within the 5° range between the settings of thermostats 54 and 55, that is to say, if the temperature rises sufficiently to cause the thermostat 55 to function, elements hereinafter described are energized to change the position of air dampers 49—49'; whereby the previously cooled air is recirculated through the cooler 11. By recirculating the air through cooler 11, the temperature of the air can be lowered sufficiently to satisfy temporary abnormal cooling demands without increasing the size of the cooling equipment.

The said dampers 49—49' are normally in the position indicated in Fig. 2, but are shifted to the dotted line positions by the energization of a pair of solenoids 168, 168'. These solenoids are connected in series through a movable contact 169 of a relay P and a movable contact 177 of relay H. The energizing circuit for the relay P leads from a junction 170 in wire 82$^a$, through wire 83 to closed contact 171 of relay H, wire 172 and resistor 173 and wire 174 to relay coil 175, and thence through wires 176 and 70 to the negative line 71. It will be observed, therefore, that the contact 169 of relay P, will engage its lower contacts when the relay H is energized, until the temperature of the aisle A and open spaces F and G of the enclosure 17 rises to the functional setting of thermostat 55. At that time the electric current is passed through the contacts of thermostat 55 and, therefore, shunts out and deenergizes the relay coil 175. This condition permits the relay contact 169 to close through the upper fixed contacts of relay P and thereby closes an energizing current through the air damper actuating coils 168 and 168' so as to move these dampers to the dotted line position shown in Fig. 2 and thereby recirculate, through the cooler 11, the previously cooled air vented from the spaces whose temperatures are being controlled. The energizing circuits through solenoids 168—168' lead from positive line 63, wires 72 to contact 177 and the lower fixed contact of relay H (assuming that relay H is energized by the closing of the outside thermostat 57), and thence through wire 178, closed contact 169 of relay P, solenoids 168—168' and wires 179 and 70 to the negative line 71.

The said thermostat 55 for controlling the operation of the air dampers 49—49' is set to function at 5° higher than the thermostat 54 for controlling the cooler 11. In order to maintain this difference for all adjustments of the thermostat 54, the thermostat 55 is provided with an auxiliary electrical heater 180. It is connected in parallel with the auxiliary heaters 94 and 160 and consequently receives the same adjustments from the weighted average resistors 149, 149$^c$, 149$^d$, etc. The energizing circuit for the auxiliary heater 180 leads from the bus connector 150, auxiliary heater 180, thence through wire 181, 153 to contact 154 of the wattage regulator relay J, and thence through wire 155 to the negative line 71. The solenoids 168—168' may also be closed to recirculate the air during the heating cycle of the system when the outside temperature is below 50° Fahrenheit. In such case the energizing circuit for said solenoids 168—168' passes from wire 72 through the normally closed upper contacts at 177 of relay H and thence through wire 178$^a$ to the lower fixed contacts of relay P. During such heating cycle, the thermostat will be normally below its functional setting and relay P will be energized to close a circuit through its lower fixed contacts though solenoids 168—168'.

Reheating air during cooling cycle

The auxiliary air heater 22, as previously pointed out, will function to reheat the previously cooled air, if the temperature of any one or more of the individual rooms is below the functional setting of its thermostat 24$^b$, 24$^c$, 24$^d$, etc. It will be observed, therefore, that the air reheating function of the auxiliary air heater 22 is confined largely to tempering of the air during the transition from the heating to cooling cycle of the control system. It is also possible, as presently described, to reheat the air during the cooling cycle of the system when the temperature of the individual rooms may be above the functional setting of their thermostats 24$^b$, 24$^c$, 24$^d$, etc. In this connection the main air heater 10 is utilized, under the control of thermostat 56.

The thermostat 56 is located in the body of the car so as to respond to the general temperature thereof. It is provided with upper and lower contacts which are connected, by means of wires 182 and 183, in parallel with the upper and lower contacts of the thermostat 53, the latter of which is utilized in controlling the air heater 10 during the heating cycle. The said thermostat 56, as manufactured, is set to function at 100° F., but it is provided with an electrical auxiliary heater 184 which is connected, in parallel with the auxiliary heaters of thermostats 53, 54 and 55. Consequently, the thermostat 56 is adjusted to lower settings by the application of heating current through the several weighted average resistors 149, 149$^c$, 149$^d$, etc., as these various resistors become effective. It will be seen, therefore, that the thermostat 56 may be set down from 100° F. to any point above 87° F., depending upon the number of weighted average resistors 149, 149ᶜ, 149ᵈ, etc., which are effective for increasing the volume of heating current thereto. The electric circuit, through auxiliary heater 184, leads from junction 185 in wire 151, through wire 186, heating coil 184 and wire 187 to its junction 188, with wires 152 and 153, and thence through wire 153, closed contact 154, of relay J, and wire 155 to the negative line 71.

In order to further explain the reheating of the previously cooled air, by the main heater 10, during the cooling cycle of the system, it will be assumed that all room thermostats 24ᵇ, 24ᶜ, 24ᵈ, etc., are satisfied. Under such condition all weighted average resistors 149, 149ᶜ, 149ᵈ, etc., will be effective and thermostats 53, 54, 55 and 56 will each receive 13° of auxiliary heat, thereby setting them down 13° from their top setting. Under such conditions the cooperating heating control thermostats 53 and 56 will break contact, at 63° F., 87° F. respectively and the cooling control thermostats 55 and 54 will break contact at 82° F. and 77° F., respectively.

It is quite plausible and frequently desirable to maintain the temperature of the cooled air in duct 13 below the functional setting of thermostat 53, while the temperature within the car remains above the functional setting of thermostat 56. Under such condition there would be no reheating of the air. However, when the temperature of the air in duct 13 falls below the adjusted functional setting of thermostat 53 and the temperature of the open section of the enclosure 17 falls below the adjusted setting of thermostat 56, the main air heater 10 is energized to reheat the air before it is delivered into the enclosure. Such functioning of the main air heater 10 will be stopped when either thermostat 53 or 56 makes contact, since the heater control relay I may be energized by the functioning of either thermostat 53 or 56, but it is deenergized only when contact is broken through both thermostats 53 and 56.

Figure 5:
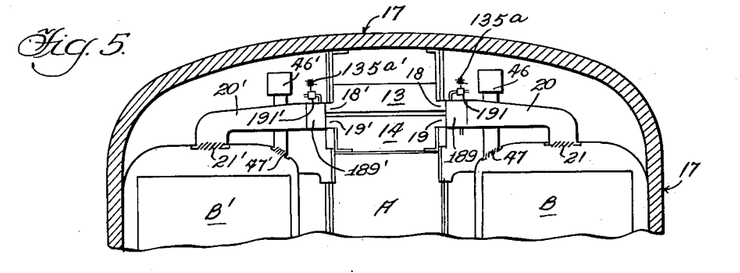
Fig. 5 is a view similar to Fig. 3, but illustrates a modified system in which individual heaters are utilized to add heat to the air delivered into the several compartments.

Referring now to the modification shown in Figs. 5 and 9: An individual heater designated 189 is arranged in each of the branch ducts 20. Each heater is supplied with heating medium through pipe 190 and spring opened valve 191. The solenoid for closing the valve 191 is designated in Figs. 5 and 9 by the reference numeral 135ᵃ. It is intended that the modification shown in Figs. 5 and 9 shall be controlled by the control circuits shown in Fig. 10. In order to accomplish this result the valve solenoids may be introduced in the control circuits at the location and substituted for the heating coils 135. The individual solenoids, in such case, will be de-energized and therefore permit its valve 191 to open each time that its associated relay, under the control of a room thermostat 24ᵇ, 24ᶜ, 24ᵈ, etc., is energized. The individual heaters 189, it will be observed, are merely substituted for the proportioning valves 41 of Figs. 1 to 4 inclusive, the air being delivered through upper and lower ducts 13 and 14 at a temperature somewhat less than is required to maintain the desired temperature within the several enclosed spaces. The temperature of this air is boosted by the operation of the individual heaters 189 sufficiently to bring the temperature of the enclosed spaces B, C, D, etc., up to the temperature settings of their respective thermostats 24ᵇ, 24ᶜ, 24ᵈ, etc. In other respects the heating and cooling system of the modified embodiment, including the control circuits for the heating and cooling apparatus may be the same as described in connection with Figs. 1 to 4, inclusive, and Figs. 6, 7, 8 and 10.

We claim:

1. In an electrical control system for controlling the temperature of an enclosure, the combination with apparatus including a main air duct, means for delivering tempered air into said main air duct, branch ducts leading from the main duct for delivering air into different zones of said enclosure, a heating element for raising the temperature of the tempered air within the main ducts and an electrically operated valve for controlling the delivery of heating medium to said heater; of means associated with each branch duct for altering the temperature of the air received from the main duct and including an electrically energized device for varying the effectiveness of said temperature altering means, a relay for each electrically energized device, an energizing circuit therefor, an energizing circuit for each electrically energized device connected through its associated relay when the latter is in one position, thermostats located in the several zones of the enclosure and each connected in shunt with the energizing circuit of the relay associated with the zone in which the thermostat is located, whereby the effectiveness of the said temperature altering devices are controlled in relation to the temperatures of their associated zones, a second relay, an energizing circuit for said electrically operated valve connected through a closed contact of the second relay and through a closed contact of each zone relay, an energizing circuit for the second relay connected through a closed contact of each zone relay, connectors defining a shunt circuit around the second relay, and a thermostat located in the main duct and connected in said shunt connections and adapted to break said shunt when the temperature in the main ducts falls below a predetermined value, whereby the said heating element is made effective only when the duct thermostat together with any one of the zone thermostats are calling for heat.

2. In an electrical system for controlling the temperature of an enclosure, the combination with a main air duct for supplying air for the enclosure, a blower for delivering air into the main duct, means including a main air tempering element for tempering the air delivered into the main duct, and a series of branch ducts for delivering air from the main duct into different zones of the enclosure; of means associated with each branch duct for altering the temperature of the air received from the main duct, separate thermostats located in each of the zones served by said branch ducts and responsive to the temperature of their respective zones for controlling the several branch duct temperature altering means, a duct thermostat responsive to the temperature of the tempered air in the main duct for controlling the main air tempering element and including an electrical heater, and means including an element actuated by the functioning of any one of the zone thermostats for closing an energizing circuit through said electrical heater, whereby the duct thermostat is adjusted to function at a lower temperature.

3. In an electrical system for controlling the temperature of an enclosure, the combination with a main air duct for supplying air for the enclosure, a blower for delivering air into the main duct, means including a main heating element and a cooling element selectively operable for tempering the air delivered into the main duct, and a series of branch ducts for delivering air from the main duct into different zones of the enclosure; of means associated with each branch duct for altering the temperature of the air received from the main duct, separate thermostats located in each of the zones served by said branch ducts and responsive to the temperatures of their respective zones for controlling the several branch duct temperature altering means, a duct thermostat responsive to a predetermined temperature of the tempered air in the main duct for controlling the main heating element and including an electrical heater, a cooling control thermostat set to function at a higher temperature than the said duct thermostat and responsive to the general temperature of the enclosure for controlling said cooling element, an electrical heater for said cooling control thermostat connected in parallel with the duct thermostat heater, and means actuated by the functioning of any one of the zone thermostats for closing an energizing circuit of equal heating value through both said electrical heaters, whereby the duct thermostat and the cooling control thermostat are both adjusted to function at lower temperature settings.

4. In an electrical system for controlling the temperature of an enclosure, the combination with a main air duct for supplying air for the enclosure, a blower for delivering air into the main duct, means including a main heating element and a cooling element selectively operable for tempering the air delivered into the main duct, and a series of branch ducts for delivering air from the main duct into different zones of the enclosure; of means associated with each branch duct for altering the temperature of the air received from the main duct, separate thermostats located in each of the zones served by said branch ducts and responsive to the temperatures of their respective zones for controlling the several branch duct temperature altering means, a duct thermostat responsive to a predetermined temperature of the tempered air in the main duct for controlling the main heating element and including an electrical heater, a cooling control thermostat set to function at a higher temperature than the said duct thermostat and responsive to the general temperature of the enclosure for controlling said cooling element, an electrical heater for said cooling control thermostat connected in parallel with the duct thermostat heater, means actuated by the functioning of any one of the zone thermostats for closing an energizing circuit of equal heating value through both said electrical heaters, whereby the duct thermostat and the cooling control thermostat are both adjusted to function at lower temperature settings, a second heat control thermostat responsive to the general temperature of the enclosure for controlling the main heating element and set to function at a higher temperature than the said cooling control thermostat and having its contacts connected in parallel with the contacts of said duct thermostat, whereby the second heat control thermostat is effective at a temperature above the temperature setting of said cooling control thermostat, when the duct temperature thermostat is calling for heat, to energize the main heating element to reheat the tempered air.

5. In an electrical system for controlling the temperature of an enclosure, the combination with a main air duct for supplying air for the enclosure, a blower for delivering air into the main duct, means including a main heating element and a cooling element for tempering the air delivered into the main duct, and a series of branch ducts for delivering air from the main duct into different zones of the enclosure, a vent duct leading from the several zones to the outside atmosphere and communicating also with the suction side of the blower, and an electrically operable damper alternatively positioned to direct the vented air to the outer atmosphere or to direct it to the suction side of the blower; of means associated with each branch duct for altering the temperature of the air received from the main duct, separate thermostats located in each of the zones served by said branch ducts and responsive to the temperatures of their responsive zones for controlling the several branch duct temperature altering means, a duct thermostat responsive to a predetermined temperature of the tempered air in the main duct for controlling the main heating element and including an electrical heater, a cooling control thermostat set to function at a higher temperature than the said duct thermostat and responsive to the general temperature of the enclosure for controlling said cooling element, an electrical heater for said cooling control thermostat connected in parallel with the duct thermostat heater, means actuated by the functioning of any one of the zone thermostats for closing an energizing circuit of equal heating value through both said electrical heaters, whereby the duct thermostat and the cooling control thermostat are both adjusted to function at lower temperature settings, and a damper control thermostat responsive to the general temperature of the enclosure for controlling the position of said damper and set to function at a higher temperature than said cooling control thermostat, whereby the position of the vented air damper is, when the general temperature of the enclosure rises to the functional setting of said damper control thermostat, changed to direct the vented air to the suction side of the blower so as to recirculate the previously cooled air.

6. In an electrical system for controlling the temperature of an enclosure, the combination with a main air duct for supplying air for the enclosure, a blower for delivering air into the main duct, means including a main heating element and a cooling element for tempering the air delivered into the main duct, and a series of branch ducts for delivering air from the main duct into different zones of the enclosure, a vent duct leading from the several zones to the outside atmosphere and communicating also with the suction side of the blower, and an electrically operable damper alternatively positioned to direct the vented air to the outer atmosphere or to direct it to the suction side of the blower; of means associated with each branch duct for altering the temperature of the air received from the main duct, separate thermostats located in each of the zones served by said branch ducts and responsive to the temperatures of their responsive zones for controlling the several branch duct temperature altering means, a duct thermostat responsive to a predetermined temperature of the tempered air in the main duct for controlling the main heating element and including an electrical heater, a cooling control thermostat set to function at a higher temperature than the said duct thermostat and responsive to the general temperature of the enclosure for controlling said cooling element, an electrical heater for said cooling control thermostat connected in parallel with the duct thermostat heater, means actuated by the functioning of any one of the zone thermostats for closing an energizing circuit of equal heating value through both said electrical heaters, whereby the duct thermostat and the cooling control thermostat are both adjusted to function at lower temperature settings, a damper control thermostat responsive to the general temperature of the enclosure for controlling the position of said damper and set to function at a higher temperature than said cooling control thermostat, whereby the position of the vented air damper is, when the general temperature of the enclosure rises to the functional setting of said damper control thermostat, changed to direct the vented air to the suction side of the blower so as to recirculate the previously cooled air, a second heat thermostat responsive to the general temperature of the enclosure for controlling the main heating element and set to function at a temperature higher than the said damper control thermostat and having its contacts connected in parallel with the contacts of said duct thermostat, whereby the second heat control thermostat is effective at high space temperature, when the duct temperature thermostat is calling for heat, to energize the main heating element to reheat the tempered air, and an electrical heater for the second heat control thermostat connected in parallel with the heater of the said duct thermostat, cooling control thermostat, and damper control thermostat, whereby all thermostats just mentioned are set down corresponding amounts upon the functioning of any one of the zone thermostats.

7. In an electrical system for controlling the temperature of a railway car subdivided into a plurality of rooms, the combination with a main air duct extending lengthwise of the car, a blower and main air heater for delivering tempered air into the main duct, a series of branch ducts leading from the main duct into the several rooms of the car; of an auxiliary air heater for adding heat to the tempered air within the main duct, means associated with each branch duct for altering the temperature of the air received from the main duct, separate thermostats located in the rooms responsive to the temperature thereof to control the temperature altering means of the branch duct serving the room in which the thermostat is located, a duct thermostat responsive to the temperature of the main duct for controlling the main air tempering means, a second means including a second duct thermostat for controlling the auxiliary air heater, and means including a relay actuated by the functioning of any one of the room thermostats to make the auxiliary air heater effective only when the second duct thermostat and any one of the room thermostats are calling for heat.

8. In an electrical system for controlling the temperature of a railway car subdivided into a plurality of rooms, the combination with a main air duct extending lengthwise of the car, a blower and main air heater for delivering tempered air into the main duct, a series of branch ducts leading from the main duct into the several rooms of the car; of individual air heaters interposed in the several branch ducts for adding heat to the air received from the main duct, thermostats located in the several rooms of the car and responsive to the temperatures therein, each thermostat controlling the individual heater associated with the branch duct leading to the room in which the thermostat is located, means including a duct thermostat responsive to the temperature in the main duct for controlling the main air heater and including an electrical heater, and means actuated by the functioning of the room thermostats for directing heating current to said electrical heater, whereby the duct thermostat is adjusted to a lower temperature setting for each functioned room thermostat.

9. In an electrical system for controlling the temperature of a railway car subdivided into a plurality of rooms, the combination with a main air duct extending lengthwise of the car, a blower and main air heater for delivering tempered air into the main duct, a series of branch ducts leading from the main duct into the several rooms of the car; of individual air heaters interposed in the several branch ducts for adding heat to the air received from the main duct, thermostats located in the several rooms of the car and responsive to the temperatures therein, each thermostat controlling the individual heater associated with the branch duct leading to the room in which the thermostat is located, means including a duct thermostat responsive to the temperature in the main duct for controlling the main air heater and including an electrical heater, an auxiliary heater for each room thermostat, a variable resistor interposed in an energizing circuit for said auxiliary heater for adjustably varying the functional setting of the room thermostat, and means actuated by the functioning of the room thermostats for directing heating current to said electrical heater, whereby the duct thermostat is adjusted to a lower temperature setting for each functioned room thermostat.

10. In an electrical system for controlling the temperature of a railway car subdivided into a plurality of rooms, the combination with a main air duct extending lengthwise of the car, a blower and main air heater for delivering tempered air into the main duct, a series of branch ducts leading from the main duct into the several rooms of the car; of individual air heaters interposed in the several branch ducts for adding heat to the air received from the main duct, thermostats located in the several rooms of the car and responsive to the temperatures therein, each thermostat controlling the individual heater associated with the branch duct leading to the room in which the thermostat is located, means including a duct thermostat responsive to the temperature in the main duct for controlling the main air heater and including an electrical heater, an auxiliary heater for each room thermostat, a variable resistor interposed in an energizing circuit for said auxiliary heater for adjustably varying the functional setting of the room thermostat, a relay actuated by the functioning of the room thermostats for directing heating current to said electrical heater, whereby the duct thermostat is adjusted to a lower temperature setting for each functioned room thermostat, and means connected through said relay for adding additional amounts of heating current to the auxiliary heater of the room thermostat when the latter is below its control point.

11. In an electrical system for controlling the temperature of a railway car subdivided into a plurality of rooms and open sections, the combination of a main air duct extending lengthwise of the car and provided with branch ducts leading into the several rooms, means for delivering air into the main duct, and means comprising a main air heater and a cooling element selectively operable for tempering the air, a duct thermostat responsive to the temperature in the main duct for controlling the main heater, a cooling control thermostat responsive to the general temperature of said open sections for controlling the cooling element and set to function at a higher temperature than said duct thermostat, separate air heaters for adding heat to the air received in the several branch ducts, individual room thermostats responsive to the temperature therein for controlling the individual air heater for the branch duct serving the room in which the thermostat is located, auxiliary electrical heaters for adding heat to each of the thermostats specified, variable resistors for adjustably varying the heating current supplied to the auxiliary heaters of the room thermostats, and means comprising a relay associated with each room thermostat for directing equal amounts of heating current to the auxiliary heaters of the said duct thermostat and to the cooling control thermostat, whereby both of the last mentioned thermostats are adjusted, in equal amounts to lower temperature settings by the functioning of each room thermostat.

12. In an electrical system for controlling the temperature of a railway car subdivided into a plurality of rooms and open sections, the combination of a main air duct extending lengthwise of the car and provided with branch ducts leading into the several rooms, means for delivering air into the main duct, and means comprising a main air heater and a cooling element selectively operable for tempering the air, a duct thermostat responsive to the temperature in the main duct for controlling the main heater, a cooling control thermostat responsive to the general temperature of said open sections for controlling the cooling element and set to function at a higher temperature than said duct thermostat, separate air heaters for adding heat to the air received in the several branch ducts, individual room thermostats responsive to the temperature therein for controlling the individual air heater for the branch duct serving the room in which the thermostat is located, auxiliary electrical heaters for adding heat to each of the thermostats specified, variable resistors for adjustably varying the heating current supplied to the auxiliary heaters of the room thermostats, means comprising a relay associated with each room thermostat for directing equal amounts of heating current to the auxiliary heaters of the said duct thermostat and to the cooling control thermostat, whereby both of the last mentioned thermostats are adjusted, in equal amounts to lower temperature settings by the functioning of each room thermostat, means for recirculating the previously cooled air through the cooling element, a recirculating control thermostat set to function at a higher temperature than the cooling control thermostat and responsive to the temperature of said open sections for controlling said air recirculating means, and an auxiliary heater for the last mentioned thermostat connected in parallel with the auxiliary heater of said duct thermostat, whereby the functional setting of the recirculating control thermostat is set down equal amounts by the functioning of each room thermostat.

13. In an electrical system for controlling the temperature of a railway car subdivided into a plurality of rooms and open sections, the combination of a main air duct extending lengthwise of the car and provided with branch ducts leading into the several rooms, means for delivering air into the main duct, and means comprising a main air heater and a cooling element selectively operable for tempering the air, a duct thermostat responsive to the temperature in the main duct for controlling the main heater, a cooling control thermostat responsive to the general temperature of said open sections for controlling the cooling element and set to function at a higher temperature than said duct thermostat, separate air heaters for adding heat to the air received in the several branch ducts, individual room thermostats responsive to the temperature therein for controlling the individual air heater for the branch duct serving the room in which the thermostat is located, auxiliary electrical heaters for adding heat to each of the thermostats specified, variable resistors for adjustably varying the heating current supplied to the auxiliary heaters of the room thermostats, means comprising a relay associated with each room thermostat for directing equal amounts of heating current to the auxiliary heaters of the said duct thermostat and to the cooling control thermostat, whereby both of the last mentioned thermostats are adjusted, in equal amounts to lower temperature settings by the functioning of each room thermostat, means for recirculating the previously cooled air through the cooling element, a recirculating control thermostat set to function at a higher temperature than the cooling control thermostat and responsive to the temperature of said open sections for controlling said air recirculating means, a reheat control thermostat set to function at a higher temperature than said recirculating control thermostat and responsive to the temperature of said open sections of the car for controlling the main heater, the contacts of the reheat control thermostat being connected in parallel with the contacts of said duct thermostat, whereby the reheat control thermostat is effective by the opening of its contacts at high car temperatures, when the duct thermostat is calling for heat, to energize the main heating element and reheat the recirculated air, and auxiliary heaters for the recirculating control thermostat and the reheat control thermostat connected in parallel with the auxiliary heater of the duct thermostat.

14. In an electrical system for controlling the temperature of a railway car subdivided into a plurality of rooms, a combination with a main air duct including upper and lower duct sections extending lengthwise of the car for containing pre-tempered air of different temperatures, a series of branch ducts leading from the main duct into the several rooms and communicating at their inlet ends with adjacent ports formed in both upper and lower sections of the main air duct, whereby streams of air from both sections of the main duct are blended in said branch ducts and delivered into said rooms, and a proportioning valve in each branch duct for varying the amount of different temperatured air delivered into the branch ducts; of means for controlling the temperature of the air in the main duct comprising a main air heater and a thermostat responsive to the temperature in the main duct for controlling the effectiveness of the main heater, separate room thermostats located in each of the several rooms and responsive to the temperature therein for varying the position of the proportioning valve in the branch duct serving the room in which such room thermostat is located, whereby the temperature of the blended air discharged from the branch ducts is controlled in relation to the temperature of the room served by such branch duct, an auxiliary air heater for adding heat to the air in the lower section of the main duct, a thermostat in the main duct responsive, below a predetermined temperature therein, for making the auxiliary air heater effective, and means including an auxiliary heater for the first mentioned duct thermostat and means actuated by the functioning of any one of the room thermostats for adjusting said first mentioned duct thermostat to a lower temperature setting, whereby the adjustment of the first mentioned duct thermostat represents the accumulative affect of all functioned room thermostats.

15. In an electrical system for controlling the temperature of a railway car subdivided into a plurality of rooms, a combination with a main air duct including upper and lower duct sections extending lengthwise of the car for containing pretempered air of different temperatures, a series of branch ducts leading from the main duct into the several rooms and communicating at their inlet ends with adjacent ports formed in both upper and lower sections of the main air duct, whereby streams of air from both sections of the main duct are blended in said brach ducts and delivered into said rooms, and a proportioning valve in each branch duct for varying the amount of different temperatured air delivered into the branch ducts; of means for controlling the temperature of the air in the main duct comprising a main air heater and a thermostat responsive to the temperature in the main duct for controlling the effectiveness of the main heater, separate room thermostats located in each of the several rooms and responsive to the temperature therein for varying the position of the proportioning valve in the branch duct serving the room in which such room thermostat is located, whereby the temperature of the blended air discharged from the branch ducts is controlled in relation to the temperature of the room served by such branch duct, an auxiliary air heater for adding heat to the air in the lower section of the main duct, a thermostat in the main duct responsive, below a predetermined temperature therein, for making the auxiliary air heater effective, and means including an auxiliary heater for the first mentioned duct thermostat and means actuated by the functioning of any one of the room thermostats for adjusting said first mentioned duct thermostat to a lower temperature setting, whereby the adjustment of the first mentioned duct thermostat represents the accumulative affect of all functioned room thermostats, means for recirculating the air through the air tempering means, and means including a thermostat having a higher temperature setting than the first mentioned duct thermostat and responsive to the general temperature of the car for controlling the said air recirculating means.

EDWARD A. RUSSELL.
TIMOTHY J. LEHANE.
ROBERT E. PIDGEON.

REFERENCES CITED

The following references are of record in the file of this patent:

UNITED STATES PATENTS

| Number | Name | Date |
|---|---|---|
| 2,182,449 | Parks et al. | Dec. 5, 1939 |
| 2,188,775 | Locke | Jan. 30, 1940 |
| 2,218,468 | Haines | Oct. 15, 1940 |
| 2,323,236 | Parks et al. | June 29, 1943 |
| 2,372,839 | McGrath | Apr. 3, 1945 |